United States Patent Office

3,629,249
Patented Dec. 21, 1971

3,629,249
DIAMINOALKYL-S-DIHYDROTETRAZINES
Masatomi Otsuka, Naruto-shi, Seizo Komura, Tokushima-shi, and Hideo Yamaguchi, Naruto-shi, Japan, assignors to Otsuka Kagaku Yakuhin Kabushiki Kaisha, Osaka-shi, Japan
No Drawing. Filed Oct. 1, 1969, Ser. No. 862,956
Int. Cl. C07d 55/58
U.S. Cl. 260—241        10 Claims

ABSTRACT OF THE DISCLOSURE

A diamine having a structural formula of

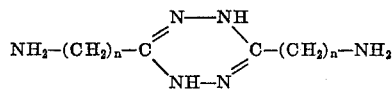

wherein $n$ is an integer of 3 to 16.

Said diamines are useful as the starting material for manufacturing polyamides and manufactured from lactams or amino acids.

---

This invention relates to novel diamines and a method of the manufacture thereof, and particularly pertains to a novel diamine containing in the molecule S-dihydrotetrazine ring and a method of the manufacture thereof.

The diamine of the invention is a compound to be expressed by the general formula:

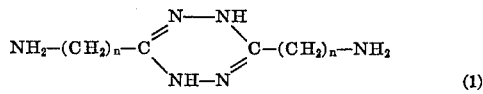  (1)

wherein $n$ is an integer of 3–16. Said compound has the nature to easily react with dicarboxylic acids to produce polyamides, so that it is useful as the material for manufacturing polyamide fibers or resins.

The present diamine can be easily prepared by reacting a mineral acid salt of hydrazine with a lactam having the general formula:

  (2)

wherein $n$ is the same as above, or with an amino acid having the general formula:

$$NH_2—(CH_2)_n—COOH \quad (3)$$

wherein $n$ is the same above.

The above reactions, in which hydrazine dihydrochloride is used, can be expressed by the following formulas:

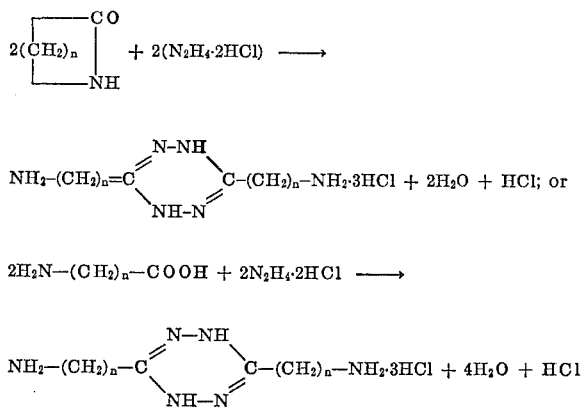

Either reaction is desirably performed in a molten condition. A mixture of a lactam or amino acid and hydrazine salt is heated with stirring to melt the lactam or amino acid and hydrazine salt so as to effect the dehydration reaction of the starting materials. The reaction temperature is in the range of 160 to 230° C., preferably 180 to 210° C. Preferable examples of the lactam and amino acid used in the invention are ε-caprolactam, γ-butyrolactam, ε-aminocaproic acid, 17-aminoheptadecanoic acid, 11-aminoundecanoic acid, etc., the most preferable being ε-caprolactam.

Typical examples of the mineral acid salt of hydrazine are hydrazine dihydrochloride, hydrazine monohydrochloride, hydrazine sulfate, dihydrazine sulfate, etc. The mineral acid salt of hydrazine may be used in equimolar or excess amount relative to the starting lactam or amino acid.

The reaction is performed under atmospheric pressure, but the substitution of the reaction atmosphere with nitrogen or like inert gas is effective for prevention of the oxidation of the product. It also is desirable to carry out the reaction under reduced pressure. Furthermore, the reaction may be performed in the presence of non-reactive solvent such as diphenyl, instead of molten reaction.

The product obtained by the present process is in a form of a mineral acid salt of the desired diamine, from which the diamine of the invention is obtainable by adding barium hydroxide, calcium hydroxide, etc. to the reaction mixture and heating the mixture under reflux condition. This reaction is represented by the following equations:

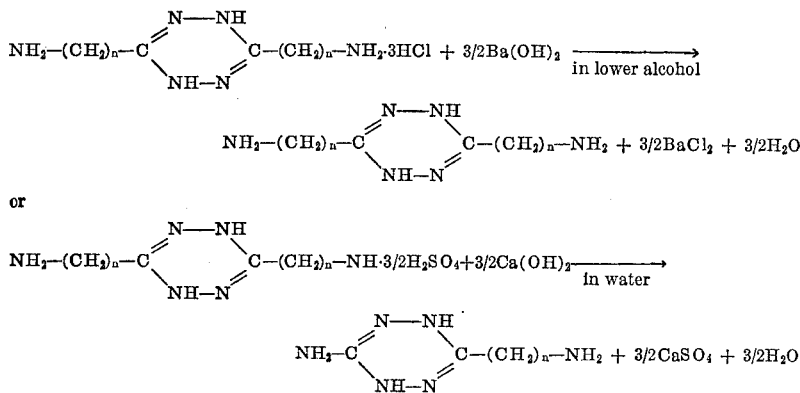

The byproduct of this reaction, barium chloride or calcium sulfate, can be separated from the reaction mixture by filtration. The reaction mixture thus obtained contains as impurities amino acid (in the case of using a lactam the amino acid is also contained in the reaction mixture as it is produced by hydrolysis of the lactam), hydrazine, mineral acid and intermediate, amino acid hydrazide. Of these impurities amino acid and mineral acid can be removed by passing the reaction mixture through an anion-exchange resin, and hydrazine and amino acid hydrazide are determined by iodine titration. Thus the present diamine represented by the general Formula 1 can be obtained free of the contamination of the impurities.

The diamine of the invention is, in general, water-soluble white waxy substance having high hydroscopicity and the aqueous solution thereof shows alkalinity. The present diamine has, further, high reactivity with dicarboxylic acid to produce polyamide, so that it is useful as the starting material for manufacturing polyamide. The polyamide obtained from the present diamine is useful particularly as fiber, which has excellent dyeing properties and good appearance and feel to the touch.

For better understanding of the invention examples are given below.

EXAMPLE 1

1 mole of ε-caprolactam and 1 mole of hydrazine dihydrochloride were heated with stirring at 180° C., and the generated hydrochloric acid gas was released from the system, and further the temperature was raised to 210° C. in 4 hours, when there was almost no hydrochloric acid gas generated, after which the system was cooled. To the system were added 1 lit. of methyl alcohol and 0.8 mole of anhydrous barium hydroxide, and the mixture was heated again under reflux condition for 1 hour, and was again cooled to precipitate solid substance. After the precipitated solid was filtered out and the methyl alcohol contained in the filtrate was distilled off the reaction mixture was dissolved in 600 ml. of water and the solution was passed through anion-exchange resin (IR–400). Thereafter the solution was condensed under reduced pressure and dissolved in alcohol to remove alcohol-insoluble impurities, and further condensed under reduced pressure, whereby 122 grams of a white waxy substance was obtained.

Elementary analysis of the resultant substance gave the following result:

Calcd. for $C_{12}H_{26}N_6$ (percent): C, 56.66; H, 10.30; N, 33.04. Found (percent): C, 56.23; H, 10.41; N, 33.00.

Iodine titration value of the substance was 0.05% (as hydrazine hydrate), and the determination thereof with 1 N-hydrochloric acid was 100% and the point of neutralization was pH 7.0.

ACETYLATION OF THE SUBSTANCE 0.2 mole of the substance of Example 1 was added to 1 mole of acetic anhydride, and the mixture was heated to 70° C. After the mixture was maintained at this temperature for 3 hours, the unreacted acetic anhydride was distilled off under reduced pressure. The resultant reaction mixture was dissolved in water, and the solution was passed through anion-exchange resin (IR–400) to remove acetic acid ion. Thereafter the mixture was condensed under reduced pressure, and dissolved in ethanol, into which was poured ether to precipitate crystals. The crystals were again dissolved in ethanol and recrystallized with ether.

The elementary analysis of the resultant crystalline substance gave the following results:

Calcd. for $C_{16}H_{30}O_2N_6$ (percent): C, 56.78; H, 8.94; O, 9.45; N, 24.83. Found (percent): C, 56.67; H, 9.03; O, 9.55; N, 24.75.

This elementary analysis shows two acetyl groups are introduced into the molecule of the waxy substance obtained in Example 1.

From these results the substance obtained in Example 1 was ascertained to be a diamine having the structural formula:

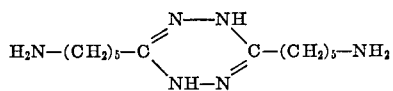

The yield rate was 96%.

EXAMPLE 2

1 mole of γ-butyrolactam, 0.5 mole of hydrazine dihydrochloride and 0.5 mole of hydrazine monohydrochloride were heated with stirring in nitrogen gas stream at 180–200° C. for 6 hours, and thereafter the system was cooled. From the resultant reaction mixture 92 grams of white waxy substance was obtained in the same manner as in Example 1.

The elementary analysis of the substance gave the following results:

Calcd. for $C_8H_{18}N_6$ (percent): C, 48.46; H, 9.15; N, 42.39. Found (percent): C, 47.97; H, 9.21; N, 42.24.

Iodine titration value of the substance was 0.1% (as hydrazine hydrate), and the determination thereof with 1 N-hydrochloric acid was 100%.

The substance obtained in this example was acetylated in the same manner as in Example 1 and the elementary analysis of the acetylated product gave the following results:

Calcd. for $C_{12}H_{22}O_2N_6$ (percent): C, 51.05; H, 7.85; O, 11.33; N, 29.77. Found (percent): C, 50.94; H, 7.96; O, 11.46; N, 29.64.

Thus the waxy substance obtained in Example 2 was ascertained to be a diamine having the structural formula of:

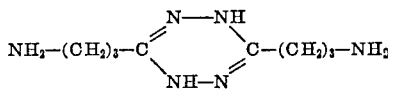

The yield rate was 93%.

EXAMPLE 3

1 mole of 17-aminoheptadecanoic acid and 1 mole of hydrazine dichloride were reacted by heating in nitrogen gas stream at 180–210° C. for 8 hours, and after being cooled the resultant reaction mixture was treated in the same manner as in Example 1, whereby 254 grams of white waxy substance was obtained.

The elementary analysis of the substance gave the following results:

Calcd. for $C_{34}H_{70}N_6$ (percent): C, 72.54; H, 12.53; N, 14.93. Found (percent): C, 72.09; H, 12.40; N, 14.84.

Iodine titration value of the substance was 0.05% (as hydrazine hydrate), and the determination thereof with 1 N-hydrochloric acid was 100%.

The substance obtained in this example was acetylated in the same manner as in Example 1 and the elementary analysis of the acetylated product gave the following result:

Calcd. for $C_{38}H_{74}O_2N_6$ (percent): C, 70.54; H, 11.53; O, 4.94; N, 12.99. Found (percent): C, 70.52; H, 11.61; O, 5.01; N, 12.86.

Thus the waxy substance obtained in this example was ascertained to be a diamine having the structural formula:

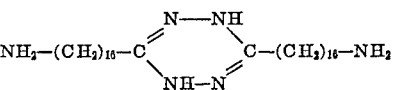

The yield rate was 90%.

EXAMPLE 4

1 mole of ε-aminocaproic acid, 0.5 mole of dihydrazine sulfate and 200 ml. of diphenyl were heated at 180° C. for 5 hours, and further heated at 210° C. for 8 hours. Thereafter the reaction mixture was cooled, to which 500 ml. of hot water was added to remove the oil layer, and to the aqueous layer was added 0.6 mole of $$Ba(OH)_2 \cdot 8H_2O$$

and heated at 100° C. for 1 hour and then cooled. The precipitated solid was filtered out and the filtrate was passed through anion-exchange resin (IR–400) column, and further treated in the manner similar to Example 1, whereby 106 grams of white waxy substance was obtained.

The elementary analysis of the resultant substance gave the following results:

Calcd. for $C_{12}H_{26}N_6$ (percent): C, 56.66; H, 10.30; N, 33.04. Found (percent): C, 56.07; H, 10.28; N, 32.75.

Iodine titration value of the substance was 0.6% (as hydrazine hydrate), and the determination thereof with 1 N-hydrochloric acid was 98%.

The substance obtained in this example was acetylated in the same manner as in Example 1 and the elementary analysis of the acetylated product gave the following result:

Calcd. for $C_{16}H_{30}O_2N_6$ (percent): C, 56.78; H, 8.94; O, 9.45; N, 24.83. Found (percent): C, 56.72; H, 8.85; O, 9.52; N, 24.91.

Thus the waxy substance obtained in this example was ascertained to be a diamine having the structural formula:

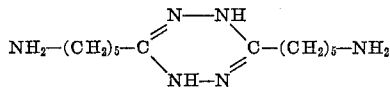

The yield rate was 82%.

EXAMPLE 5

1 mole of 11-aminoundecanoic acid and 1 mole of hydrazine monohydrochloride were heated at 180° C. for 3 hours and further heated at 200° C. for 3 hours under reduced pressure, and after cooled, the resultant reaction mixture was treated in the same manner as in Example 1, whereby 187 grams of white waxy substance was obtained.

The elementary analysis of the resultant substance gave the following results:

Calcd. for $C_{22}H_{46}N_6$ (percent): C, 66.95; H, 11.75; N, 21.30. Found (percent): C, 66.87; H, 11.62; N, 21.21.

Iodine titration value of the substance was 0.05% (as hydrazine hydrate), and the determination of the substance was 100%.

The resultant substance was acetylated in the same manner as in Example 1 and the elementary analysis of the acetylated product gave the following result:

Calcd. for $C_{26}H_{50}O_2N_6$ (percent): C, 65.23; H, 10.53; O, 6.68; N, 17.56. Found (percent): C, 65.16; H, 10.64; O, 6.77; N, 17.43.

Thus the waxy substance obtained in this example was ascertained to be a diamine having the structural formula:

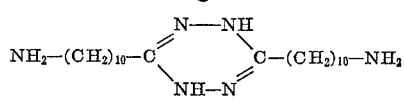

The yield rate was 95%.

What we claim is:

1. A compound of the formula of

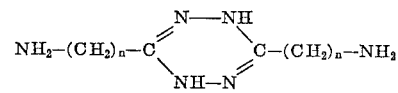

wherein $n$ is an integer of from 3 to 16.

2. The compound according to claim 1, in which $n$ is 5.
3. The compound according to claim 1, in which $n$ is 3.
4. The compound according to claim 1, in which $n$ is 10.
5. The compound according to claim 1, in which $n$ is 16.
6. A method for manufacturing compound of claim 1, which comprises heating at 160 to 230° C. a mineral acid salt of hydrazine with a lactam having the formula:

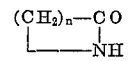

wherein $n$ is an integer of from 3–16, or with an amino acid having the formula:

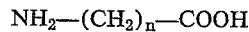

wherein $n$ is the same as above, to effect the dehydration reaction of the starting materials.

7. The method according to claim 6, in which said lactam is one member of the group consisting of ε-caprolactam and γ-butyrolactam.
8. The method according to claim 7, in which said lactam is ε-caprolactam.
9. The method according to claim 6, in which said amino acid is one member of the group consisting of ε-aminocaproic acid, 11-aminoundecanoic acid and 17-aminoheptadecanoic acid.
10. The method according to claim 6, in which said temperature is in the range of 180 to 210° C.

References Cited

UNITED STATES PATENTS 3,151,111  9/1964  Remanick _____ 260—241

JOHN D. RANDOLPH, Primary Examiner

R. T. BOND, Assistant Examiner

U.S. Cl. X.R.

260—78, 239.3, 2947, 326.5